United States Patent Office 3,580,851
Patented May 25, 1971

3,580,851
STABLE ALKALI CHLORITE MIXTURES
Christian Heid and Karl-Heinz Keil, Frankfurt am Main-Fechenheim, Germany, assignors to Cassella Farbwerke Mainkur Aktiengesellschaft, Frankfurt am Main-Fechenheim, Germany
No Drawing. Filed July 29, 1969, Ser. No. 845,883
Claims priority, application Switzerland, Aug. 6, 1968, 11,744/68
Int. Cl. D06l 3/06
U.S. Cl. 252—99
6 Claims

ABSTRACT OF THE DISCLOSURE

Stable aqueous mixtures of alkali chlorite containing a compound of the formula $$R-O-(CH_2-CH_2-O)_x-CH_2-CH_2-O-(CH_2)_y-\overset{R_1}{\underset{|}{C}H}-COOH$$

or alkali metal salts thereof wherein R is $-C_nH_{2n+1}$ or

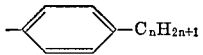

$n$ is 6 to 18;
$x$ is 6 to 30;
$y$ is 0 or 1; and
$R_1$ is hydrogen or methyl.

---

Mixtures containing alkali chlorites are of great importance in the field of textile and paper industry. They are used, for instance, for the bleaching of fibers and fabrics and as oxidizing agents for dyeing with vat and sulfur dyestuffs.

French Pat. 1,453,380 describes such mixtures having the pH-value thereof adjusted to above 10. They consist of alkali chlorites and surfactants. The latter are aliphatic or arylaliphatic polyglycol ethers that contain an oxethylene chain consisting of at least 8 mols ethylene oxide, and having a terminal hydroxyl group esterified with organic or inorganic acids which are stable to oxidation. A typical example is the potassium salt of the diester of phosphoric acid and the condensation product of nonylphenol and 10 mols ethylene oxide, which has the following formula:

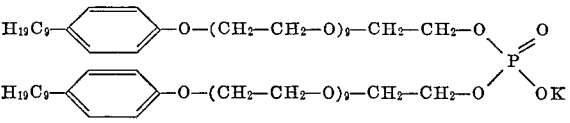

According to said French patent, a mixture of sodium chlorite and said potassium salt of the diester of phosphoric acid is homogeneous at temperatures ranging from 20 to 60° C. and stable, for a maximum of 200 hours, at 60° C., the pH-value decreasing during this period only from 11.4 to 10.8. Furthermore, said patent discloses that storage of such a mixture at 20° C. for three months or at 40° C. for twenty-eight days changed neither its content of chlorite nor its pH-value.

It has to be taken into consideration, however, that in the preparation of diesters of phosphoric acid of the above type according to the teachings of French Pat. 1,371,966, mixtures of mono and diesters are always formed and that they are difficult to separate. Therefore, technical grade products always have a content of monoesters and form, together with alkali chlorites, mixtures of substantially lower stability than obtained with relatively pure diesters. Moreover, for many applications the relatively pure diesters do not impart adequate stabilization.

The decrease in pH-value, particularly at higher temperatures during a long period of storage, accelerates as the pH-value decreases and ultimately mixtures are obtained that display an acid reaction and smell of chlorodioxide. In the case of large batches where the heat of reaction is not eliminated rapidly enough, a violent, sometimes dangerous decomposition can occur. Presumably, this decomposition is caused by the saponification of the esters, whereby free acid is formed which lowers the pH-value of the mixtures and thus renders oxidation reactions possible.

According to the present invention, it has been found that aqueous mixtures of alkali chlorites, preferably sodium chlorite, and surfactants can be obtained that are stable to oxidation and superior to other known mixtures of that kind, if, instead of the esters of ethoxylated alkyl phenols or alcohols, their ether carboxylic acids or the alkali salts thereof having the following general formula are employed:

$$R-O-(CH_2-CH_2-O)_x-CH_2-CH_2-O-(CH_2)_y-\overset{R_1}{\underset{|}{C}H}-COOH$$

wherein R is $-C_nH_{2n+1}$ or

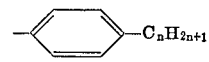

$n$ denotes an integer of from 6 to 18, preferably from 7 to 12;
$x$ is an integer of from 6 to 30, pereferably from 9 to 19;
$y$ is 0 or 1; and
$R_1$ is hydrogen or methyl.

Particularly preferred ether carboxylic acids are the reaction products of ethoxylated alkyl phenols and ethoxylated alcohols with monochloro acetic acid as described in Swiss Pats. 273,395; 283,968 and 329,038 and ether carboxylic acids obtained by the addition of acrylonitrile or methacrylonitrile to ethoxylated alkyl phenols or alcohols and subsequent saponification of the formed nitriles as described in U.S. Pats. 2,401,607 and 2,437,905 and German Auslegeschrift 1,256,640.

Preferably, the weight ratio of sodium chlorite to surfactant in the instant compositions ranges from 10:1 to 1:1, the most preferred compositions having a weight ratio ranging from 3:1 to 2:1. It is also preferred that the solid content of the aqueous mixtures of the instant invention comprises from 10 to 60% by weight of the total weight thereof.

As compared to the mixtures described in French Pat. 1,453,380, those of the present invention distinguish themselves by a considerably higher stability and certain other advantages. They have, for instance, higher points of turbidity. Moreover, it was found that in the mixtures with alkali chlorites, unlike the esters described in the French patent, it is possible to replace up to 50% by weight of the ether carboxylic acids with their precursor ethoxylated alkyl phenols or ethoxylated alcohols, whereby the stability of the mixtures is not affected. This is advantageous inasmuch as the last-mentioned non-ionogenic products are generally superior to the corresponding anionic ether carboxylic acids as to dispersing effect. In the light of the teachings of the above French patent, it was surprising and unforseeable that such mixtures have excellent storage stability.

Although it is unnecessary to include a buffering agent in the instant compositions, the presence of such agent exerts an advantageous effect when utilizing the mixtures for bleaching and oxidizing purposes. The preferred buffering agents include sodium carbonate and sodium borate. Generally the amount ranges from 0.1 to 10% by weight based on the total weight of the aqueous composition.

The superiority of the instant mixtures over those of French Pat. 1,453,380 becomes evident from a test series of results which are compiled in the following table. In these tests, mixtures were used containing, in aqueous soltion, 14.5% sodium chloride and 5.4% of active agent adjusted, with sodium hydroxide solution, to the specified pH-value. The mixtures were stored at 60° C. The pH-value determined at certain intervals of time is the measure for the degree of stability.

or an alkali metal salt thereof wherein R is —$C_nH_{2n+1}$ or

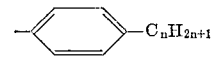

$n$ is 6 to 18; $x$ is 6 to 30; $y$ is 0 or 1 and $R_1$ is hydrogen

| Dispersing agent | Mixture ratio | Temperature, degree | pH, value Initial | pH, value Terminal | Period, days | Point of turbidity, degree |
|---|---|---|---|---|---|---|
| $C_9H_{19}$—⟨O⟩—O—$(CH_2$—$CH_2O)_9$—$CH_2$—$CH_2$—O—$\overset{O}{\underset{\|}{P}}(OH)_2$ | | 60 | 12.6 | 5.4 | 19 | 84-85 |
| $C_9H_{19}$—⟨O⟩—O—$(CH_2$—$CH_2O)_{13}$—$CH_2$—$CH_2$—O—$CH_2$—COOH | | 60 | 12.8 | 12.3 | 43 | >100 |
| $C_9H_{19}$—⟨O⟩—O—$[(CH_2$—$CH_2$—O$)_9$—$CH_2$—$CH_2$—O$]_2$—$\overset{O}{\underset{\|}{P}}$—OH | | 60 | 12.1 | 8.6 | 9 | 80-83 |
| $C_9H_{19}$—⟨O⟩—O—$(CH_2$—$CH_2O)_{13}$—$CH_2$—$CH_2$—O—$CH_2$—COOH <br> $C_9H_{19}$—⟨O⟩—O—$(CH_2$—$CH_2O)_{19}$—$CH_2$—$CH_2OH$ <br> $C_9H_{19}$—⟨O⟩—O—$(CH_2$—$CH_2O)_9$—$CH_2$—$CH_2OH$ <br> $C_9H_{19}$—⟨O⟩—O—$(CH_2$—$CH_2O)_6$—$CH_2$—$CH_2OH$ | 8.75:1:1.875:1.875 | 60 | 11.9 | 11.3 | 43 | 81 |
| $C_9H_{19}$—⟨O⟩—O—$(CH_2$—$CH_2O)_{13}$—$CH_2$—$CH_2$—O—$CH_2$—COOH <br> $C_9H_{19}$—⟨O⟩—O—$(CH_2$—$CH_2O)_{13}$—$CH_2$—$CH_2OH$ <br> $C_9H_{19}$—⟨O⟩—O—$(CH_2$—$CH_2O)_{11}$—$CH_2$—$CH_2OH$ <br> $C_9H_{19}$—⟨O⟩—O—$(CH_2$—$CH_2O)_6$—$CH_2$—$CH_2OH$ | 7:1:1:1.8 | 60 | 12.0 | 11.4 | 43 | 73-75 |
| $C_9H_{19}$—⟨O⟩—O—$(CH_2$—$CH_2O)_{13}$—$CH_2$—$CH_2$—O—$CH_2$—COOH <br> $C_{18}H_{37}$—O—$(CH_2$—$CH_2O)_{19}$—$CH_2$—$CH_2OH$ | 3.9:1 | 60 | 12.0 | 11.3 | 43 | 79-80 |
| $C_9H_{19}$—⟨O⟩—O—$(CH_2$—$CH_2O_{13}$—$CH_2$—$CH_2$—O—$CH_2$—COOH <br> $C_9H_{19}$—⟨O⟩—O—$(CH_2$—$CH_2O)_{19}$—$CH_2$—$CH_2$—O—$CH_2$—COOH | 1:1 | 60 | 11.9 | 11.6 | 43 | >100 |
| $C_9H_{19}$—⟨O⟩—O—$(CH_2$—$CH_2O)_{13}$—$CH_2$—$CH_2$—O—$CH_2$—COOH <br> $C_9H_{19}$—⟨O⟩—O—$(CH_2$—$CH_2O)_{19}$—$CH_2$—$CH_2$—O—$CH_2$—COOH | 2.86:1 | 60 | 11.7 | 11.2 | 43 | >100 |
| $C_9H_{19}$—⟨O⟩—O—$(CH_2$—$CH_2O)_{13}$—$CH_2$—$CH_2$—O—$CH_2$—COOH <br> $C_9H_{19}$—⟨O⟩—O—$(CH_2$—$CH_2O)_6$—$CH_2$—$CH_2$—O—$CH_2$—COOH | 1:1 | 60 | 11.8 | 11.2 | 43 | 79-81 |
| $CH_3$—$(CH_2)_{10}$—$CH_2$—O—$(CH_2$—$CH_2O)_{11}$—$CH_2$—$CH_2$—O—$CH_2$—COOH | | 60 | 11.5 | 11.3 | 43 | >100 |
| $CH_3$—$(CH_2)_{10}$—$CH_2$—O—$(CH_2$—$CH_2O)_{16}$—$CH_2$—$CH_2$—O—$CH_2$—COOH | | 60 | 11.8 | 11.4 | 43 | >100 |
| $CH_3$—$(CH_2)_{10}$—$CH_2$—O—$(CH_2$—$CH_2O)_{11}$—$CH_2$—$CH_2$—O—$CH_2$—COOH <br> $CH_3$—$(CH_2)_{10}$—$CH_2$—O—$(CH_2$—$CH_2O)_{11}$—$CH_2$—$CH_2OH$ <br> $CH_3$—$(CH_2)_{10}$—$CH_2$—O—$(CH_2$—$CH_2O)_{16}$—$CH_2$—$CH_2OH$ | 3.68:1:1 | 60 | 11.7 | 11.2 | 43 | 91-93 |
| $CH_3$—$(CH_2)_{10}$—$CH_2$—O—$(CH_2$—$CH_2O)_{16}$—$CH_2$—$CH_2$—O—$CH_2$—COOH <br> $CH_3$—$(CH_2)_{10}$—$CH_2$—O—$(CH_2$—$CH_2O)_{11}$—$CH_2$—$CH_2OH$ <br> $CH_3$—$(CH_2)_{10}$—$CH_2$—O—$(CH_2$—$CH_2O)_{16}$—$CH_2$—$CH_2OH$ | 3.9:1.15:1 | 60 | 11.9 | 11.3 | 43 | 76-80 |

What is claimed is:
1. An aqueous mixture of sodium chlorite and a compound of the formula:

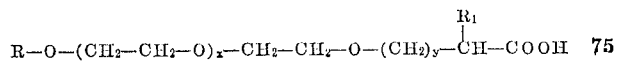

or methyl wherein the weight ratio of sodium chlorite to said compound ranges from 10:1 to 1:1.

2. The aqueous mixture of claim 1 wherein $n$ is from 7 to 12.

3. The aqueous mixture of claim 1 wherein $x$ is from 9 to 19.

4. The aqueous mixture of claim 1 wherein the weight ratio of sodium chlorite to said compound ranges from 3:1 to 2:1.

5. The aqueous mixture of claim 1 wherein the solid content thereof comprises from 10 to 60% by weight of the total aqueous mixture.

6. The aqueous mixture of claim 1 containing, as a buffering agent, sodium carbonate or sodium borate.

References Cited
UNITED STATES PATENTS

| 2,801,972 | 8/1957 | Bartlett et al. | 260—538X |
| 2,802,715 | 8/1957 | Hofer et al. | 8—108X |
| 3,050,359 | 8/1962 | Lehn | 8—108 |

MAYER WEINBLATT, Primary Examiner

U.S. Cl. X.R.

252—187; 1—108